United States Patent [19]

Tang

[11] 4,296,671
[45] Oct. 27, 1981

[54] HYDRAULIC BRAKE BOOSTER AND CONTROL VALVE THEREFOR

[75] Inventor: Louis S. Tang, South Bend, Ind.

[73] Assignee: The Bendix Corporation, Southfield, Mich.

[21] Appl. No.: 114,799

[22] Filed: Jan. 24, 1980

[51] Int. Cl.³ .............................................. F15B 20/00
[52] U.S. Cl. .................................................. 91/5; 91/6
[58] Field of Search ............................................ 91/5, 6

[56] References Cited

U.S. PATENT DOCUMENTS

| | | | |
|---|---|---|---|
| 3,719,044 | 3/1973 | Bach | 60/547 B X |
| 3,877,227 | 4/1975 | Demido | 60/547 B X |
| 4,084,304 | 4/1978 | Myers | 251/359 X |

*Primary Examiner*—Gerald A. Michalsky
*Attorney, Agent, or Firm*—Paul David Schoenle; Ken C. Decker

[57] ABSTRACT

A hydraulic brake booster defines a pressure chamber (24) and includes a control valve (26). A sleeve (40) on the control valve includes a spacer (58) and the control valve includes an annular member (60). The spacer is engageable with a booster housing (14) to limit movement of the sleeve and the annular member is engageable with an accumulator valve assembly (32) during a failure mode to provide a safety power assist. The spacer is also maintained in spaced relation to the accumulator valve assembly.

11 Claims, 5 Drawing Figures

HYDRAULIC BRAKE BOOSTER AND CONTROL VALVE THEREFOR

The present invention relates to a hydraulic brake booster which is fluidly coupled to a pressure source such as a power steering pump. The booster is actuated during a brake application to provide a power assist. In particular, a booster housing substantially defines a pressure chamber and movably supports a control valve which is operable to communicate fluid pressure to the pressure chamber. More specifically, the present invention relates to the operation of the control valve in relation to the fluid pressure communicated to the pressure chamber.

As illustrated in U.S. Pat. Nos. 3,719,044, 3,877,227 and 4,084,304, the control valve generally extends into the pressure chamber to movably carry a sleeve. The sleeve is normally biased to a first position on the control valve to maintain the pressure chamber open to the pressure source via passages within the control valve and housing. During a brake application, an actuator lever is movable to move the sleeve and control valve to a position communicating fluid pressure to the pressure chamber. If the pressure level within the pressure chamber fails to reach a predetermined level, the lever is further moved to move the sleeve to a second position on the control valve wherein the pressure chamber is isolated from the pressure source. Thereafter, a cap movable with the sleeve is engageable with a valve member to communicate an accumulator with the pressure chamber so that a power assist can be provided during a brake application even when the pressure source fails to communicate adequate fluid pressure to the pressure chamber.

In all of the aforementioned patents, the movement of the sleeve is limited by the engagement of the cap with the booster housing; however, such engagement also actuates the valve member to communicate the accumulator with the pressure chamber.

The present invention provides a portion on the sleeve which is engageable with the booster housing to limit movement of the sleeve; however, the portion is at all times spaced from or remote from an accumulator valve member. In addition, the control valve is provided with an annular member movable therewith and engageable with the accumulator valve member to communicate the accumulator with the pressure chamber. In a preferred embodiment, a differential area on the control valve is pressure responsive to the fluid pressure within the pressure chamber to limit the fluid pressure communicated to the pressure chamber to a first predetermined level. At substantially the same time that the first predetermined pressure level is reached, the sleeve member portion is engageable with the booster housing. In this position, the control valve is free to oscillate relative to the housing and sleeve in response to fluid pressure.

It is an advantageous effect of the present invention that the control valve can oscillate relative to the booster housing and sleeve when the first predetermined pressure level is reached to account for variations in the pressure of the pressure chamber. Moreover, the sleeve will remain independent of the accumulator valve member so that inadvertent communication between the accumulator and pressure chamber is avoided.

The invention will now be described by way of example, with references to the accompanying drawings in which.

Figures 1, 5:
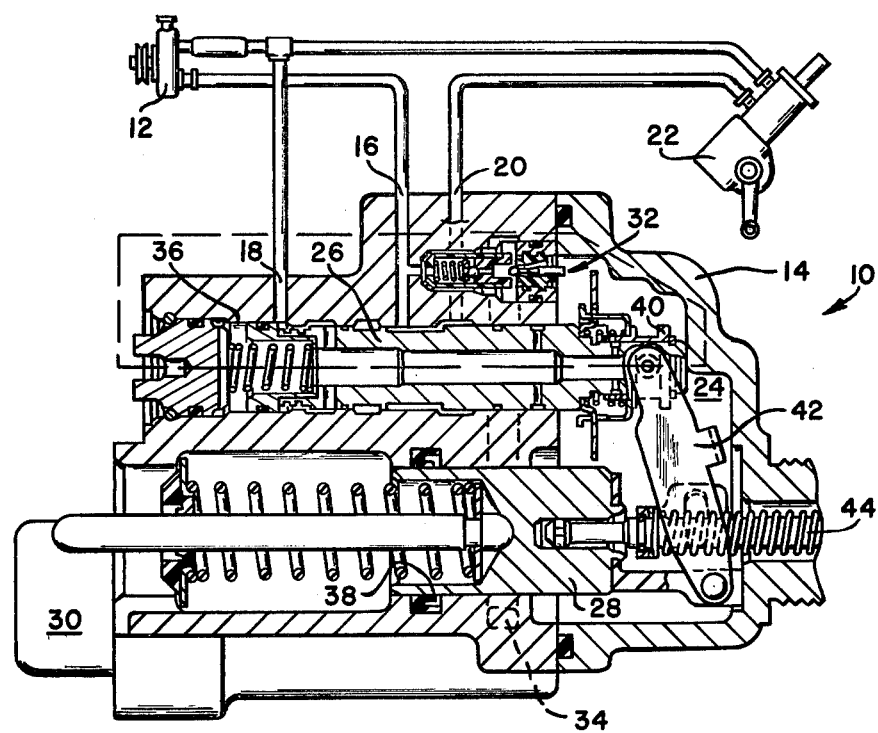
FIG. 1 is a schematic of a hydraulic brake system with a hydraulic brake booster according to the present invention shown in cross section.
FIG. 5 is a perspective view of a spacer and annular member illustrated in cross section in FIGS. 1-4.

The hydraulic brake system of FIG. 1 includes a hydraulic brake booster 10 fluidly coupled to a pressure source 12, such as a power steering pump. The booster 10 defines a housing 14 forming an inlet 16, a return 18 and an outlet 20. The return communicates with the pressure source 12 while the outlet 20 communicates with a steering gear 22.

Within the housing 14 a pressure chamber 24 receives fluid pressure from the inlet 16 via a control valve 26 and a piston 28 is movable within the housing in response to fluid pressure within the pressure chamber to actuate braking. An accumulator 30 receives fluid pressure to be stored therein and an accumulator valve assembly 32 is operable to control communication between the accumulator and pressure chamber via a housing passage 34. A pair of bores 36 and 38 within the housing lead to the pressure chamber 24 for the purpose of movably carrying the control valve and piston, respectively. The control valve extends into the pressure chamber and movably carries a sleeve 40. An actuator lever 42 couples to the sleeve 40 and piston 28 and an input member 44 is engageable with the lever 42.

Figure 2:
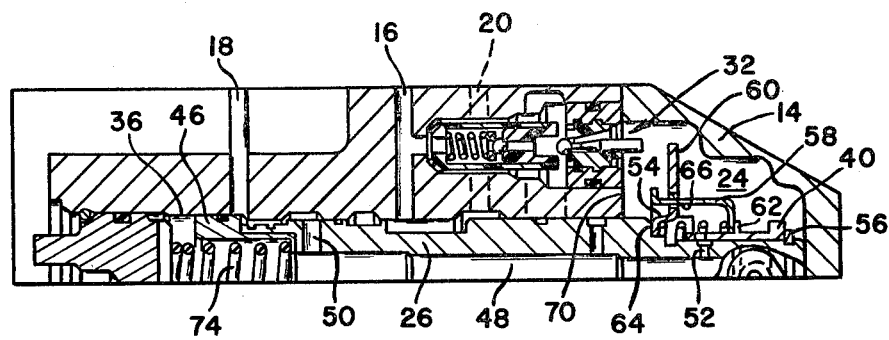
FIG. 2 is an enlarged view of the encircled portion of FIG. 1.

Turning to FIG. 2, the bore 36 is stepped to accommodate an enlarged end 46 of the control valve 26. An axially extending passage 48 extends from a first radial passage 50 to a second radial passage 52 and is also open at the enlarged end 46. A resilient member 54 biases the sleeve 40 into abutment with a snap ring 56 so that in a first position the sleeve provides communication between the pressure chamber 24 and the radial passage 52. The resilient member 54 is engageable with a spacer or portion of the sleeve 58, which may be integral with the sleeve 40, although illustrated in the drawings as a separate part from the sleeve. In addition, the resilient member is engageable with an annular member 60 which may be integral with the control valve 26, although illustrated in the drawings as a separate part from the control valve. A shoulder 62 on the sleeve 40 opposes the spacer 58 and a shoulder 64 on the control valve 26 opposes the annular member 60. With the resilient member 54 disposed between the shoulders, the annular member 60 is movable with the control valve and the spacer 58 is movable with the sleeve. A slot or opening 66 on the annular member 60 receives the end 68 of the spacer opposite the shoulder 62. The end 68 is flared outwardly but is smaller in radial dimension than the annular member 60 so that only the annular member 60 opposes the accumulator valve 32. When the spacer end 68 is engageable with a wall 70 of the housing 14, the end is spaced from or remote from the valve assembly 32.

As shown more clearly in FIG. 5, the spacer 58 and annular member 60 comprise a unitary assembly. The annular member defines three arcuate slots 66 for receiving the radially flared ends 68 of the spacer 58. The annular member is substantially disc shaped while the spacer forms a cylinder.

In a reset or idle position, the control valve 26 is biased by spring 74 into engagement with the housing. The spring force of spring 74 being smaller than the spring force of spring 54. When the input member 44 is actuated during a brake application, the lever 42 is rotated to bias the sleeve 40 and control valve 26 via spring 54 to move toward spring 74, thereby contracting the spring 74. In a conventional manner, fluid pressure from the inlet 16 is communicated via lands and grooves between the housing bore 36 and control valve 26 to the axially extending passage 48. From the passage 48, fluid pressure is communicated to the enlarged end 46 of the control valve and also to the pressure chamber 24 via passage 52. Because the spring force of spring 74 is less than for spring 54, the initial movement of the sleeve 40 will cause the control valve to move substantially the same distance so that the sleeve will not initially cover the passage 52. Fluid pressure within the pressure chamber 24 acts against the piston 28 to move the same and initiate braking.

Figure 3:
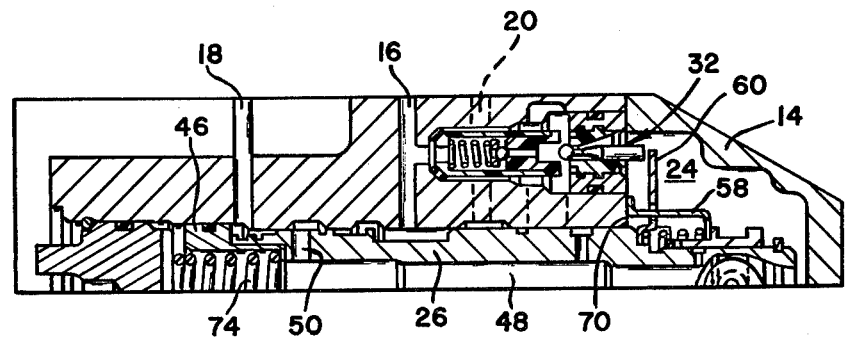
FIGS. 3 and 4 are views similar to FIG. 2, but showing a control valve in various positions during a brake application.

Continued braking moves the sleeve and control valve further toward spring 74 as shown in FIG. 3. As a result, the fluid pressure is increased at the enlarged end 46 and also within pressure chamber 24, the fluid pressure acting on both ends of the control valve being substantially equal. Also the spring 54 begins to contract to align the sleeve with the passage 52. In view of the differential area defined by the enlarged end 46, a resulting force on the control valve biases the latter toward the pressure chamber. At a predetermined maximum pressure level, the resulting force plus the force of contracted spring 74 more than offsets the force of contracted spring 54 so that the control valve is prevented from moving toward the spring 74 and the fluid pressure communicated to the pressure chamber is limited to the maximum predetermined level. By adjusting the diameter of the enlarged end 46 and the spring constants of springs 54 and 74, it is possible to provide for the end 68 of spacer 58 to engage the housing wall 70 when the fluid pressure within the pressure chamber is substantially equal to the maximum predetermined pressure level.

Figure 4:
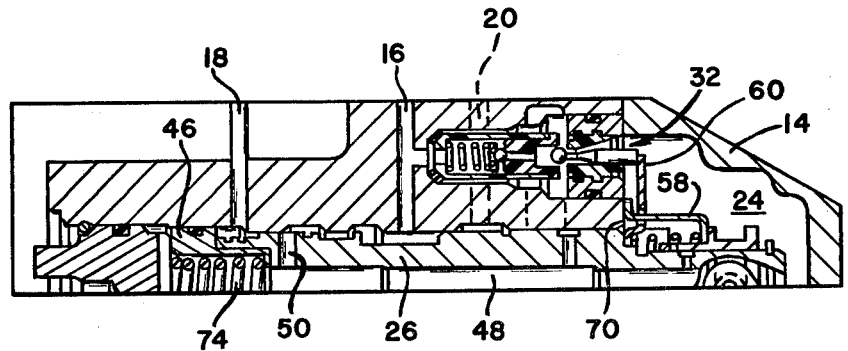

As shown in FIG. 3 at the maximum predetermined pressure level, the end 68 is engaging the housing wall 70 while the annular member 60 is spaced from the accumulator valve assembly 32. In the position illustrated in FIG. 3, the sleeve and spacer remain substantially fixed relative to the housing and the control valve can oscillate relative to the housing, sleeve and spacer in response to pressure variations in the pressure chamber and at the enlarged end of the control valve. If the pressure source is rendered inoperable, the fluid pressure at the enlarged end is diminished so that the force of spring 54 overcomes the force of spring 74 to move the control valve further toward the spring 74 and also bring the annular member 60 into engagement with the accumulator valve assembly 32 as shown in FIG. 4. The annular member acts against the assembly 32 to open the accumulator to the pressure chamber 24, thereby communicating stored fluid pressure to the pressure chamber to provide a safety power assist to braking.

Although the annular member 60 and the spacer 58 are illustrated as annular elements it is within the skill of the art to provide partially arcuate elements so long as the spacer 58 is engageable with the housing and the member 60 opposes the valve assembly 32.

I claim:
1. In a hydraulic brake booster, a housing having an inlet and substantially defining a pressure chamber, a control valve movably disposed within the housing and being operable to communicate fluid pressure from the inlet to the pressure chamber, an accumulator normally storing fluid pressure and communicating with the pressure chamber when the control valve is operable and the fluid pressure within the pressure chamber is below a predetermined value, valve means cooperating with the accumulator to normally close communication between the accumulator and the pressure chamber, a sleeve member carried by the control valve and being movable relative to the control valve to close communication between the inlet and the pressure chamber when the fluid pressure in the latter is below the predetermined value, and an annular member engageable with the valve means to open communication between the accumulator and the pressure chamber, characterized by the sleeve member including a portion which is engageable with the housing to limit movement of the sleeve member when the control valve is operable and the annular member is movable with the control valve when the portion is engageable with the housing to engage the annular member with the valve means.

2. The hydraulic brake booster of claim 1 characterized by the portion of the sleeve member comprising a separate part which is maintained in engagement with the sleeve member by a resilient member.

3. The hydraulic brake booster of claim 1 characterized by a resilient member extending between the annular member and the sleeve member portion.

4. The hydraulic brake booster of claim 1 characterized by the annular member including a plurality of openings and the portion of the sleeve member extends through the openings to face the housing.

5. The hydraulic brake booster of claim 1 characterized by the control valve defining a shoulder and the annular member is normally biased into engagement with the shoulder.

6. The hydraulic brake booster of claim 1 characterized by the control valve and annular member being movable relative to the sleeve member to engage the annular member with the valve means and the sleeve member continues to close communication between the inlet and the pressure chamber.

7. The hydraulic brake booster of claim 1 characterized by the portion being engageable with the housing at a predetermined maximum pressure level within the pressure chamber.

8. In a hydraulic brake booster having a housing substantially defining a pressure chamber and movably supporting a control valve, the control valve being operable to move relative to the housing to communicate fluid pressure to the pressure chamber, the control valve also including means responsive to the fluid pressure within the pressure chamber to limit movement of the control valve when the fluid pressure within the pressure chamber is above a first predetermined amount, a sleeve cooperating with the control valve to close communication with the pressure chamber when the control valve is operable and the fluid pressure within the pressure chamber is below a second predetermined amount, a spacer cooperating with the sleeve and engageable with the housing to limit movement of the sleeve, and an accumulator selectively communicating with the pressure chamber via a dump valve, characterized by the spacer being engageable with the housing when the fluid pressure within the pressure chamber is above the first predetermined amount and the spacer being at all times remote from the dump valve, and the control valve including a portion movable therewith to engage the dump valve to open the accumulator to the pressure chamber when the fluid pressure therein is below the second predetermined amount.

9. The hydraulic brake booster of claim 8 in which said spacer is engageable with the housing at substantially the same time that said means is responsive to the fluid pressure with the fluid pressure chamber to limit movement of said control valve.

10. A hydraulic brake booster comprising a housing substantially defining a pressure chamber, a control valve movably disposed within said housing and being operable to communicate fluid pressure to said pressure chamber, means responsive to the fluid pressure within said pressure chamber to limit movement of said control valve when the latter is operable, a sleeve member carried by said control valve and being movable relative to said control valve from a first position opening communication to said pressure chamber to a second position closing communication to said pressure chamber, an accumulator normally storing pressurized fluid and selectively communicating with said pressure chamber via a dump valve, and said control valve including a portion cooperating with said dump valve to open said accumulator to said pressure chamber when said sleeve member is in the second position and said control valve is movable relative to said sleeve member, said sleeve member including a spacer engageable with said housing when said sleeve member is in the second position.

11. The hydraulic brake booster of claim 10 in which a resilient member extends between and is engageable with said control valve portion and said sleeve member portion.

* * * * *